United States Patent [19]
Ault

[11] 4,217,071
[45] Aug. 12, 1980

[54] SLIP SHEET REPOSITIONING APPARATUS

[75] Inventor: Thomas W. Ault, Kankakee, Ill.

[73] Assignee: General Foods Corporation, White Plains, N.Y.

[21] Appl. No.: 843,764

[22] Filed: Oct. 20, 1977

[51] Int. Cl.² .............................................. B65G 67/24
[52] U.S. Cl. .................................. 414/395; 108/51.3; 254/390; 294/104; 294/117; 414/402
[58] Field of Search ................... 254/135 R, 147, 188, 254/189; 214/1 R, 1 S, 1 B, 1 F, 1.7, 152, 8.5 C, 10.5 R, 310; 108/51.3, 52.1; 294/81 R, 104, 106, 117; 414/395, 402

[56] References Cited

U.S. PATENT DOCUMENTS

| Re. 29,192 | 4/1977 | Anderson et al. | 108/51.3 |
| 1,074,703 | 10/1913 | Fancher | 214/1.7 |
| 1,111,953 | 9/1914 | Cunningham | 214/1.7 |
| 1,345,930 | 7/1920 | Jones et al. | 294/106 |
| 1,810,680 | 6/1931 | Rothgarn | 254/189 X |
| 2,368,478 | 1/1945 | Landwier | 214/1 S X |
| 2,619,241 | 11/1952 | Jessen | 214/310 X |
| 2,937,677 | 5/1960 | McIlwain | 294/106 X |

FOREIGN PATENT DOCUMENTS

| 990759 | 6/1976 | Canada | 294/104 |
| 1063403 | 12/1953 | France | 414/395 |

Primary Examiner—Frank E. Werner
Attorney, Agent, or Firm—Michell E. Alter; Bruno P. Struzzi

[57] ABSTRACT

A device and a method for repositioning loads carried on slip sheets in restricted space locations. The device comprises a pair of elongated gripping members, a plurality of vice devices operatively engaged with the gripping members to move the gripping members between open and locked positions, and system for pulling the gripping members transversely to their elongated axis. According to the method, a slip sheet is positioned and clamped between the gripping members and is then pulled. Preferably, a pulley for changing the direction of an applied pulling force will be employed.

5 Claims, 5 Drawing Figures

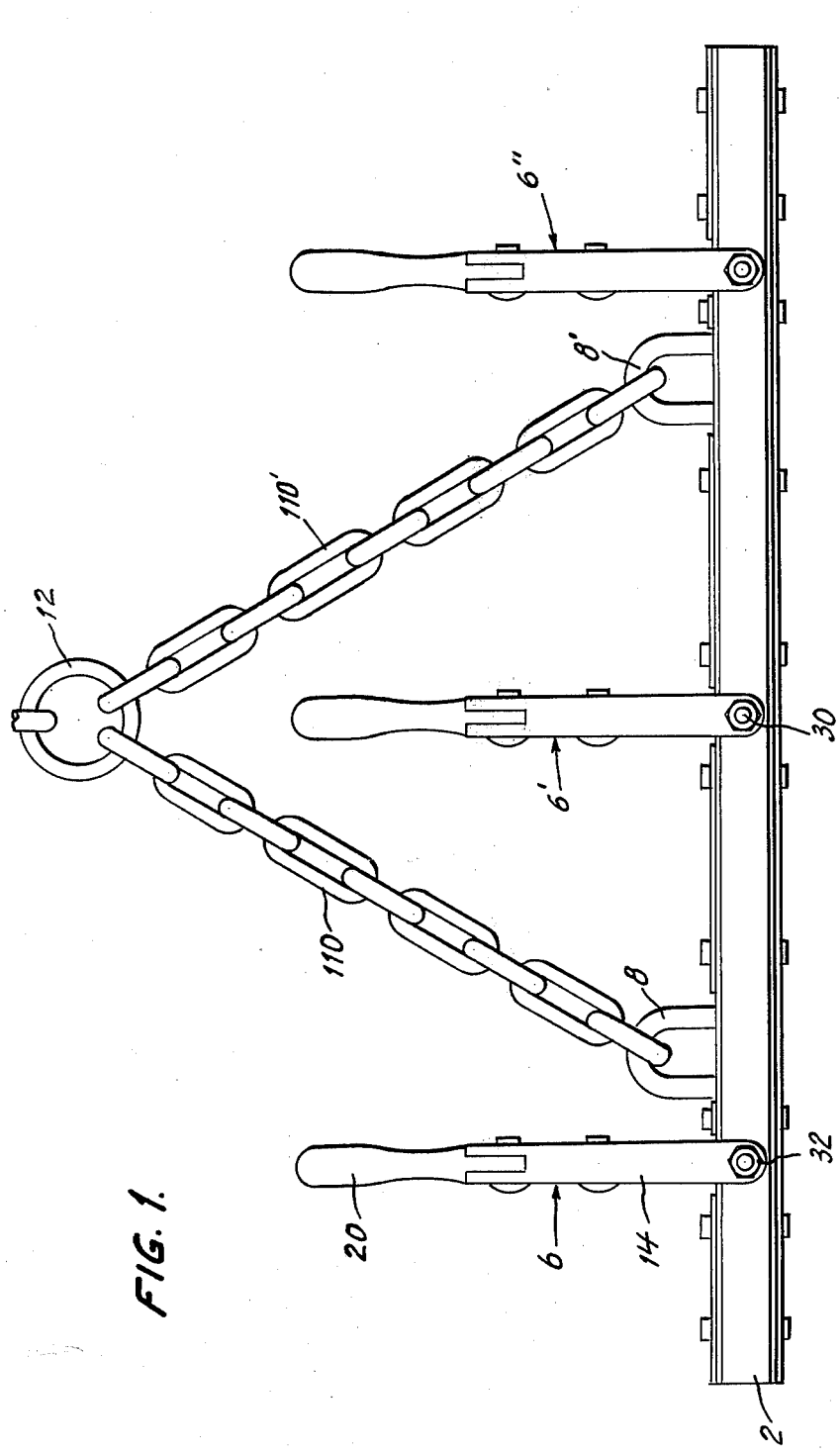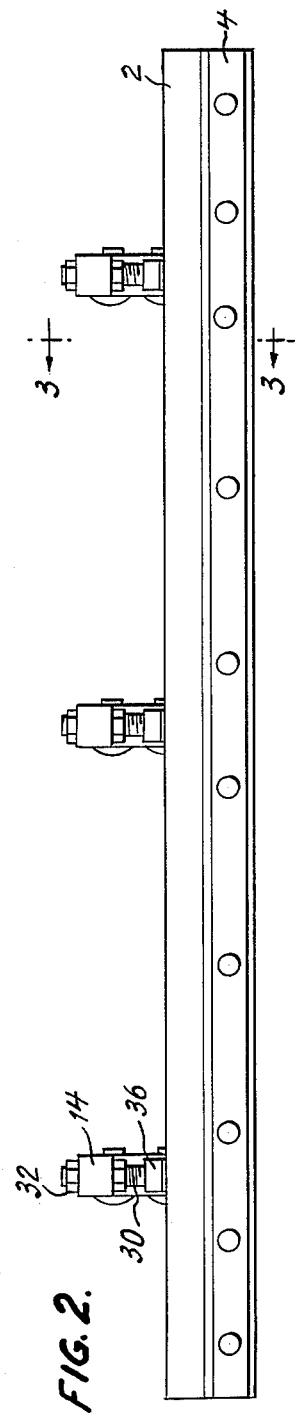

SLIP SHEET REPOSITIONING APPARATUS

BACKGROUND OF THE DISCLOSURE

The present invention relates to improvements in transporting manufactured goods, and more particularly to improvements in transportation where wooden pallets are replaced by fiberboard slip sheets.

Manufacturers of packaged goods of suitable size, weight and durability have in the past stacked them in appropriate configurations on wooden pallets for shipment and storage. This has long proved to be an effective and efficient method. However, it is currently evolving that in many situations the heavy, bulky, costly wooden pallets are not necessary and can be functionally replaced with fiberboard sheets called slip sheets.

While the cost savings of the slip sheet method are clear, an operational problem is presented where loads are partially obscured in rail car doorways. This was not a problem with wooden pallets but is the source of considerable inefficiency when using slip sheets. With the wooden pallets, a lift truck fork can be inserted into a corner end of a pallet and the load shifted laterally into position for full access by the fork truck. With slip sheets, on the other hand, it has been common practice to manually repile the cases from the inaccessable load onto another sheet. Typically, four loads out of fifty-six may require this manual repiling before the lift truck with its slip sheet attachment has sufficient access to the other loads.

SUMMARY OF THE INVENTION

It is therefore among the objects of the present invention to provide a device and a method capable of repositioning slip sheet carried loads in restricted spaces.

It is among the more specific objects of the present invention to provide a device and a method capable of removing slip sheet carried loads that are obscured from free access by a lift truck in a railroad car doorway, without the need for manually restacking the load.

These and other objects are accomplished according to the present invention which provides a slip sheet transfer device and method. The device comprises: a pair of elongated gripping members, a plurality of vice means operatively engaged with said gripping members to allow insertion of a slip sheet therebetween and to move said gripping members between an open and a locked position; and means for pulling said gripping members transversely to their elongated axis. The method comprises the steps of inserting a slip sheet between a pair of elongated gripping members, locking said gripping members in gripping relationship with said slip sheet and pulling said gripping members to reposition said slip sheet.

BRIEF DESCRIPTION OF THE DRAWINGS

The invention will become more apparent from the ensuing description especially when read in light of the attached drawings wherein:

FIG. 1 is a plan view of a slip sheet transfer device according to this invention.

FIG. 2 is an elevation view of the device shown in FIG. 1.

DETAILED DESCRIPTION

Figure 3:
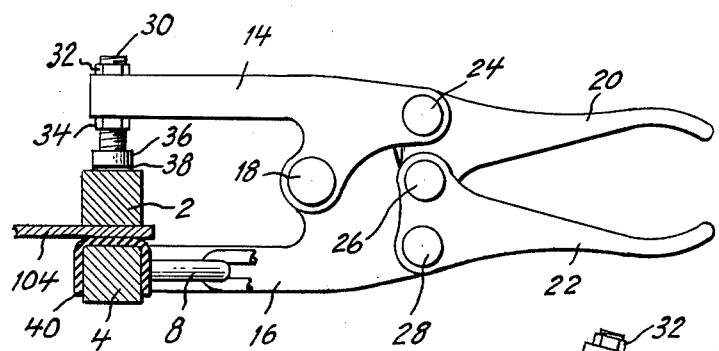
FIG. 3 is a sectional view of the device shown in FIG. 2, taken along line 3—3, showing the vice means mechanism and gripping members in locked position.

The slip sheet transfer device and method of the present invention make it possible to reposition slip sheet carried loads from highly inaccessable locations or orientations to those which permit pickup and transfer by conventional means, such as lift trucks fitted with push-pull devices.

Referring to FIGS. 1, 2, 3 and 4, a preferred device according to this invention is shown. Shown therein are two elongated gripping members, 2 and 4, which are operably engaged with a plurality of vice means shown generally as 6, 6' and 6". The preferred embodiment shown employs three vice means, but it will be understood by those skilled in the art that a lesser or greater number can be employed so long as the elongated gripping members can be held in gripping relationship with a slip sheet and evenly distribute the clamping force along the length of contact with the slip sheet.

As shown in the Figures, U rings 8 and 8' are secured to the lower gripping member 4 for engagement with means to apply a pulling force to the gripping members. Neither the shapes nor exact locations of the rings 8 and 8' are of critical importance, so long as a pulling force can be applied to the gripping members without unduly distorting the slip sheet. While the rings 8 and 8' are shown to be attached only to one of the gripping members, in this case lower member 4, it will be understood that the applied pulling force is also transmitted to the upper gripping member 2 by virtue of the operable engagement of the gripping members with the vice means 6, 6' and 6". Alternatively, ring members similar to 8 and 8' may be employed on both elongated gripping members 2 and 4.

Connected with rings 8 and 8' are chains 10 and 10', respectively. Both chains are coupled by means of ring 12 which can be connected to any suitable means for applying a pulling force. The ring 12 is located sufficiently distant from the members 2 and 4, and the vice means 6, 6' and 6" to prevent any interference of one with the operation of the other. Instead of chains, cables or other tension transmitting members can be employed. Further, instead of employing a coupling ring 12, any functionally equivalent means can be employed. It is possible, in fact, to use only a single piece of chain or cable connected at its ends to rings 8 and 8', with the pulling force being applied directly to the chain or cable at a bend at the midpoint.

Figure 4:
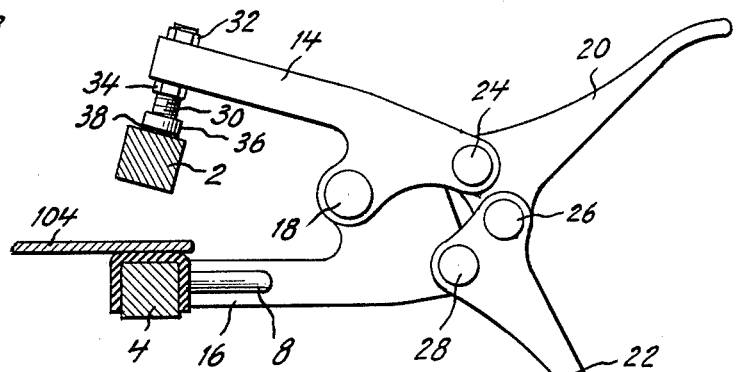
FIG. 4 is a sectional view similar to that shown in FIG. 3, but showing the vice means mechanism in the open position.

The vice means 6, 6' and 6" can be of any suitable construction which will enable their operative engagement with gripping members 2 and 4. The preferred type of vice means is shown in the Figures and is especially apparent from FIGS. 3 and 4 which show some of the detail of its construction and manner of engagement with members 2 and 4. The vice means has jaws 14 and 16 which are both pivotal about shaft 18. The preferred vice means shown also comprise handles 20 and 22. As shown in FIGS. 3 and 4, handle 20 is pivotally engaged with jaw 14 about shaft 24 and with handle 22 about 26. Similarly, handle 22 is pivotally engaged with jaw 16 about shaft 28. A commercially available vice means of this type is a Lapeer Knu-Vise #LUP-1200 Toggle Plier.

Operably engaged with the jaws 14 and 16 are gripping members 2 and 4, respectively. In the particular embodiment shown, jaw 14 is engaged with member 2 in a manner allowing adjustment while jaw 16 is fixed to member 4 by welding. At the terminal portion of jaw 14 nearest member 2, a threaded bolt 30 extends through a bore in jaw 14 and is held in place by locking nuts 32 and 34. The head 36 of bolt 30 is fixed to gripping member 2 by a weld 38. Thus by loosening both nuts 32 and 34, sliding bolt 30 within the bore, and then retightening the nuts against jaw 14, the degree of extension of member 2 toward member 4 can be adjusted to any of a variety of predetermined settings. By varying the juxtaposition of the gripping members in this manner, the device can be adjusted to apply any desired predetermined gripping pressure to slip sheets of varying thicknesses.

As shown in FIGS. 3 and 4, elongated gripping members 2 and 4 comprise solid steel bars having moderate cambers about the periphery of their opposed gripping surfaces. Also seen in FIGS. 3 and 4 is a hard rubber cover 40 over the gripping surface of gripping member 4. The hard rubber serves the combined function of increasing friction, allowing some resilience and retarding ripping of the slip sheets. If desired, both gripping surfaces can be covered in this manner or with any other functionally equivalent material. Also, there are some operations with light loads or structurally sound slip sheets where the coverings may be wholly eliminated.

In operation of the device of this invention, handles 20 and 22 are moved to the open position as shown in FIG. 4. This causes jaws 14 and 16 to open and gripping members 2 and 4 to become spaced apart when all of the separately actuatable vice means are in the open position. In the open position, a slip sheet is allowed to be inserted between the gripping members. Moving the handles of each of the vice means to the locked position, as shown in FIG. 3 where shaft 26 presses inwardly against the rearward edge of jaw 16, exerts a uniformly distributed gripping force against both surfaces of the slip sheet. By virtue of the previously described pivotal connections between the jaws and handles and the proper sizing of these components as is known in the art, a snapping in and quick release clamping action is provided by the vice means.

The employment of this device and the described operation to transfer a load from an area of restricted space will now be made more clear by reference to a particular work situation as represented schematically in FIG. 5. Therein, a number of stacks A-D of cases of packaged goods are supported by slip sheets within a railroad box car, the wall of which is shown in section as 100. These stacks make such efficient use of the space within the box car that there is, in this illustration, no opportunity for a lift truck to enter the box car through open doorway 102, properly orient itself in relation to stack A and effect its transfer from the car. Attempts to make corner gripping contact with the slip sheet gripping device on the lift truck with a slip sheet carried load in these conditions are generally impractical due to obscured access and resulting slip sheet damage. Accordingly, the device and method of this invention are employed to shift or reposition the stack so that removal with the lift truck can be effected.

Figure 5:
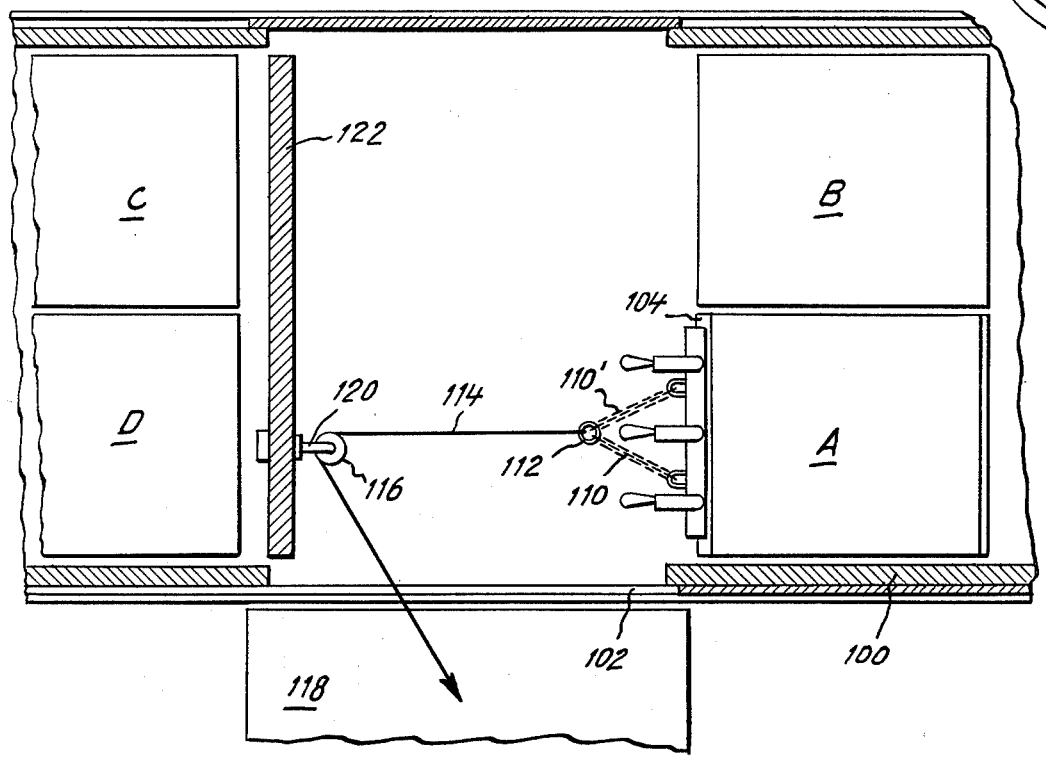
FIG. 5 is a schematic showing an inaccessable slip sheet carried load being repositioned in accordance with this invention.

As shown in FIG. 5, the slip sheet 104 carrying the load of stack A is inserted between the elongated gripping members of a device of this invention and locked therebetween to thereby hold the slip sheet in gripping relationship. As can be seen in the drawing, the gripping members extend at least a major extent across the length of the edge of the slip sheet being gripped. Coupling ring 112 couples chains 110 and 110' with cable 114 which passes over a pulley or other force translating device 116. Pulling force is applied to the cable and thus the gripping members and the slip sheet by lift truck (not shown) or other suitable means such as fixed or portable winch on dock 118.

The use of pulley 116 or a similar device is necessary where space is restricted and it is not possible to pull the slip sheet carried load without changing the direction of the applied pulling force. In this particular example, a bracket 120 of any suitable construction is attached to the bottom edge of a bulkhead 122 at a point approximately along the midline of the load on the slip sheet. Thus, when tension is applied to cable 114 by lift truck or other device, the direction of the pulling force is changed as the cable passes over pully 116 and the loaded slip sheet is pulled into the open doorway of the box car. From there it can be lifted and transferred in conventional manner.

This above description of the invention is for the purpose of teaching those skilled in the art how to put the present invention into practice and is not intended to detail and describe all of the possible modifications and variations thereof. However, many such modifications and variations will be apparent to those skilled in the art upon reading this description, and it is intended to include all of these within the scope of the present invention which is defined by the following claims.

What is claimed is:

1. The combination of a railroad box car having a bulkhead therein and a hand portable slip sheet transfer device associated therewith, said device comprising:
    a pair of elongated solid metal gripping members having moderate cambers about their opposed gripping surfaces wherein at least one member of said elongated gripping members has a hard rubber gripping surface,
    a plurality of independently actuatable toggle pliers having jaws operatively engaged with said gripping members and having the ability to move said gripping members between an open and a locked position relative to a slip sheet positioned therebetween, said gripping members having adjustment means movable in a direction perpendicular to the face of the sheet to vary the gripping pressure between said members and said slip sheet positioned therebetween,
    means for applying a pulling force for pulling said gripping members transversely to their elongation
    and means mounted on said bulkhead for changing the direction of said pulling force.

2. The device of claim 1 wherein the means mounted on said bulkhead for changing the direction of said pulling force further comprises a pulley.

3. A device according to claim 2 wherein the plurality of independently actuatable toggle pliers comprises three independently actuatable toggle pliers.

4. A device according to claim 3 wherein both solid metal gripping members have a hard rubber gripping surface.

5. The device of claim 4 wherein the means for applying a pulling force for pulling said gripping members transversely to their elongation comprises a lift truck.

* * * * *